Sept. 9, 1941.   E. W. FISHER, JR., ET AL   2,255,613

MACHINERY PACKING

Filed June 6, 1940

INVENTORS:
Edward W. Fisher Jr.
and William H. Gudinas,
BY Fraser, Myers & Manley,
ATTORNEYS.

Patented Sept. 9, 1941

2,255,613

UNITED STATES PATENT OFFICE 2,255,613

MACHINERY PACKING

Edward W. Fisher, Jr., and William H. Gudinas, Palmyra, N. Y., assignors to The Garlock Packing Company, Palmyra, N. Y., a corporation of New York Application June 6, 1940, Serial No. 339,123

3 Claims. (Cl. 288—3)

This invention relates to improvements in machinery packings, and is particularly adapted for use in sealing an orifice between a rotating shaft and its housing, or between analogous relatively movable machine elements.

The invention comprises in general a flexible sealing element and a spring adapted to be mounted in a metal shell by a pair of clamping rings, one of relatively stocky dimensions in cross section and the other in the form of a perforated, relatively thin, rigid disk.

It is an object of the invention to provide a pair of clamping rings of the above-described character of which the disk-like ring may serve as a means of extending the effective area of the clamping surface of the stocky ring, the purpose of employing two rings, instead of one, being to provide means whereby sealing devices of different radial depths may be equipped with clamping rings of which the stock ring will be of uniform cross-sectional dimension for each device, whereas the relatively thin disk-like rings will be of radial dimensions such as to conform with the requirements of the various devices of different radial depths.

In the accompanying drawing illustrating various preferred forms of the invention—

Figure 2:
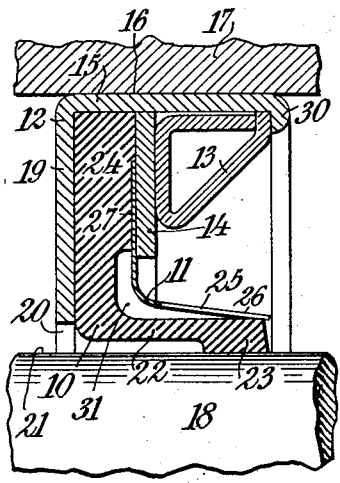
Fig. 2 is a fragmentary cross-sectional illustration of the same device as assembled with a journal bearing and its housing.
Figure 1:
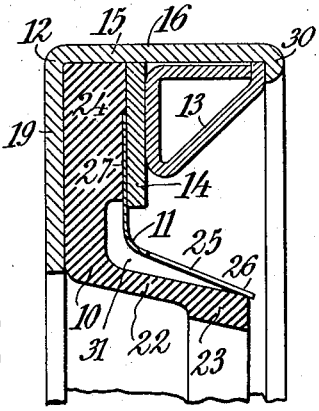
Figure 1 is a fragmentary cross-sectional view of a device embodying the invention of a form adapted to serve as an oil seal for a journal bearing.
Figure 3:
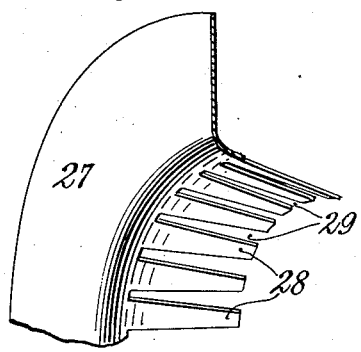
Fig. 3 is a fragmentary perspective view of a spring adapted to maintain the sealing element of a device such as is illustrated by Figs. 1 and 2 in fluid-tight engagement with a shaft.

The form of the invention illustrated by Figs. 1, 2 and 3 comprises generally an assembly of elements consisting of a flexible sealing ring 10, a metal spring 11, a metal shell 12, and a pair of metal clamping rings 13 and 14, respectively.

The metal shell 12 may comprise an outer cylindrical element 15, having an external surface 16 adapted to be mounted in fluid-tight contact with the housing 17 of a shaft 18 with which the sealing device is intended to be assembled.

The cylindrical element 15 of the shell may be provided at one of its margins with an inwardly directed flange 19 of radial dimensions such as to afford a free working clearance 20 between its inner margin and the outer surface 21 of the shaft.

The sealing element may have a sleeve-like portion 22 adapted to extend along a part of the shaft intended to be surrounded by the shell 12. Said sleeve-like element may have at one of its margins a sealing lip 23 adapted to be maintained in fluid-tight contact with the shaft with which the sealing device is to be assembled, and may have at its opposite margin an outwardly disposed flange 24, which may be seated against and backed by the flange 19 of the shell.

The spring 11 may comprise a conical portion 25 to surround and extend along a part of the sleeve 22, said conical portion having a marginal portion 26 so disposed as to encircle the terminal sealing lip of the sleeve, and having at its opposite margin an outwardly extending flange 27 by which the spring may be held in an assembled relation with other parts of the device to be mounted in the shell.

The marginal portion 26 of the spring may be made flexible by dividing it into a circumferential series of resilient fingers 28 (see Fig. 3), as by means of a succession of spaced incisions 29 which may be extended as far as may be desired toward, or even into and partway across, its flanged margin, and the dimensions and degree of inclination of the conical portion of the spring may be such that the fingers 28 will make contact with the terminal lip only of the sealing device and hold it in its oil sealing relation with the shaft 18.

The rings 13 and 14 afford means whereby the sealing element 10 and its spring 11 may be clamped and held in a state of compression between the flange 19 of the shell and a retaining lip 30 which may be turned inwardly from the margin of the cylindrical element 15 of the shell opposite the flanged margin which backs the flange of the sealing element.

Figure 4:
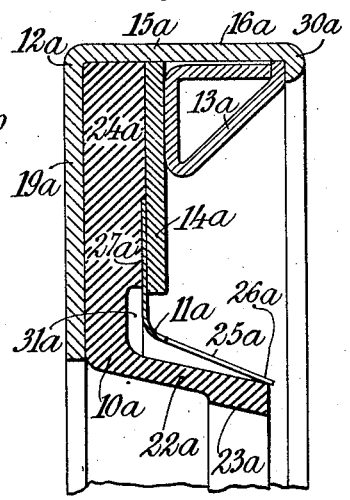
Fig. 4 is a fragmentary cross-sectional view of a modified form of sealing device embodying the invention, said form being of materially greater radial depth than that of the device illustrated by Fig. 1.

The form of the invention illustrated by Fig. 4 differs from that represented by Figs. 1, 2 and 3 only in that the radial dimensions of the flanges 24a and 19a of the sealing element 10a and its shell 12a and the radial dimension of the disk-like clamping ring 14a of the form illustrated by Fig. 4 are materially greater than the radial dimensions of the corresponding parts of the form shown in Fig. 1.

Since like parts of the forms of the invention illustrated by Figs. 1 and 4 have been designated by corresponding reference characters, with the exception that the letter *a* has been added to each character applied to the form represented by Fig. 4, any further detailed description of that form of the invention will be unnecessary.

Of the two clamping rings 13 and 14 of the form of the invention illustrated by Fig. 1, and 13a and 14a of the form of the invention indicated by Fig. 4, the rings 13 and 13a are of like form in cross section. These rings may be constructed of sheet metal, and, being of a triangular cross-sectional form, are of relatively great strength. They may be made of a relatively stocky configuration having a radial depth which need not differ materially from their axial dimensions. These rings 13 and 13a are of a type which is relatively expensive to manufacture as compared with the simple, perforated metal disk which serves as the ring 14 in one form of the invention and the ring 14a in the other.

What would be an obvious means of providing clamping rings for the forms of invention illustrated by Figs. 1 and 4 would be to equip each with a single triangular clamping ring, the ring used as a part of the construction illustrated by Fig. 4 being of very materially greater radial depth than that used as a part of the construction represented by Fig. 1. This obvious means of providing clamping rings would necessitate the construction of a triangular ring of different configuration for each of the various sealing devices manufactured having different radial depths. In order to avoid this necessity of manufacturing the expensive metal rings of triangular form in cross section of different configurations for each of the various sizes of sealing devices to be produced, the novel features of this invention have been resorted to in accordance with which a triangular ring of uniform size is used as one of the clamping elements of each sealing device irrespective of its radial depth, and the effective clamping surface of the ring of triangular form in cross section is increased, as to its radial dimension, to the extent necessary, by combining the ring of triangular form in cross section with the simple, perforated metal disk of appropriate width.

Figure 5:
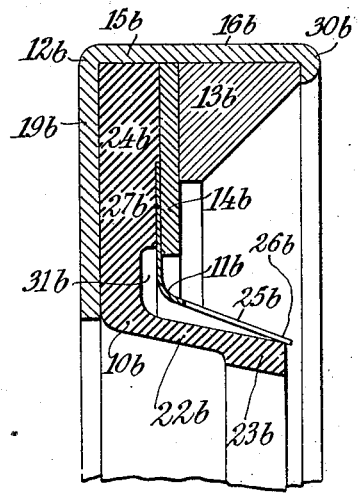
Fig. 5 is a fragmentary cross-sectional view of another modified form of sealing device embodying the invention, having a solid clamping ring as a substitute for the hollow metal clamping ring used as an element of each of the forms of the invention illustrated by Figs. 1 and 4.

The form of the invention illustrated by Fig. 5 differs from the forms illustrated by Figs. 1 and 4 only in that it is of a different radial depth from that of either of the two forms previously described, and in that the stocky clamping ring of triangular form in cross section is a solid ring rather than a hollow ring made of sheet metal.

The parts of the sealing device illustrated by Fig. 5 and the corresponding parts of the sealing device illustrated by Fig. 1 are designated by the same reference characters, except that the letter *b* has been added to each of the reference characters applied to the device represented by Fig. 5.

The radial depth of the sealing device illustrated by Fig. 5 is somewhat greater than that of the one shown in Fig. 1 and somewhat less than that of the one represented by Fig. 4. It will be apparent, however, that the solid, triangular clamping ring of the device illustrated by Fig. 5 and the hollow sheet-metal clamping ring used as a feature of the devices illustrated by Figs. 1 and 4 are interchangeable and that either ring may be used as a part of the clamping means for a seal of any radial depth within reasonable limitations.

Further detailed description of the form of the invention illustrated by Fig. 5 will be unnecessary.

It will be obvious that the spring, a portion of which is shown in detail in Fig. 3, may be used as a part of each of the various forms of sealing devices herein disclosed.

The feature of spacing the spring 11 from the sealing device 10 as at 31, Figs 1 and 2, and as at 31a in Fig. 4, and at 31b in Fig. 5, in order that the material of the flange of the sealing element, when compressed to firmly clamp it in its assembled relation with other elements of the device, may not be caused to flow into a confined space between the spring and the sealing element and thus disturb the intended adjustments of those elements, pertains to an invention not herein claimed but which is disclosed and claimed in applicant's copending application Serial No. 339,122, filed June 6, 1940.

The invention is not intended to be limited to the specific forms herein selected for purposes of illustration, but should be regarded as covering modifications and variations thereof within the scope of the appended claims.

What is claimed is:

1. A device adapted to seal the space between a shaft and its housing; said device comprising a metal shell to be mounted fluid-tight in the housing and having an inwardly disposed marginal flange; a flexible sealing element having a sleeve to extend along a part of the shaft to be surrounded by the shell and an outwardly disposed flange backed against the flange of the shell; a spring having a conical portion surrounding and extending along a part of the sleeve of the sealing element and an outwardly directed flange by which it may be held in an assembled relation with other parts of the device; and means comprising an inturned retaining lip on the margin of the shell opposite that which backs the flange of the sealing element by which portions of all parts of the device assembled with the shell may be clamped between said retaining lip and said flange, said means including a pair of spacing rings held in a state of compression between said retaining lip and other of the said parts, one of said rings being a stocky band of which the radial and axial cross-sectional dimensions do not materially differ, and the other being a relatively thin, perforated, surface extending, metal disk, which may be of materially greater radial dimensions than the stocky band, the ratio of the radial depths of the band and disk being dependent upon the radial depth of the sealing device of which they are parts.

2. The device defined by claim 1, of which the stocky band is of solid material throughout its cross-sectional area.

3. The device defined by claim 1, of which the stocky band is a hollow, sheet-metal ring of triangular form in cross section.

EDWARD W. FISHER, Jr.
WILLIAM H. GUDINAS.